(12) United States Patent
Hirsou et al.

(10) Patent No.: US 6,798,094 B2
(45) Date of Patent: Sep. 28, 2004

(54) ROTARY ELECTRIC MACHINE, AND IN PARTICULAR MOTOR VEHICLE ALTERNATOR, COMPRISING A STATOR ELASTICALLY MOUNTED IN A HEAT-CONDUCTIVE RESIN

(75) Inventors: Daniel Hirsou, Berck sur Mer (FR); Eric Le Quere, Equihen Plage (FR); Michel Magnier, Cuco (FR); Didier Selosse, Le Touquet (FR)

(73) Assignee: Valeo Equipements Electriques Moteur, Creteil (FR)

( * ) Notice: Subject to any disclaimer, the term of this patent is extended or adjusted under 35 U.S.C. 154(b) by 94 days.

(21) Appl. No.: 10/111,449

(22) PCT Filed: Oct. 8, 2001

(86) PCT No.: PCT/FR01/03095
§ 371 (c)(1),
(2), (4) Date: Jul. 24, 2002

(87) PCT Pub. No.: WO02/29958
PCT Pub. Date: Apr. 11, 2002

(65) Prior Publication Data
US 2003/0020338 A1 Jan. 30, 2003

(30) Foreign Application Priority Data
Oct. 6, 2000 (FR) .............................................. 00 13527
May 15, 2001 (FR) .............................................. 01 06386

(51) Int. Cl.⁷ ................................................ H02K 9/00
(52) U.S. Cl. ......................................... 310/52; 310/51
(58) Field of Search ............................. 310/52, 64, 51, 310/91, 43

(56) References Cited

U.S. PATENT DOCUMENTS

| 3,648,086 | A | * | 3/1972 | Renner et al. ................. 310/63 |
| 4,145,626 | A |   | 3/1979 | Aroshidze et al. |
| 4,894,574 | A | * | 1/1990 | Ragaly ........................ 310/258 |
| 4,963,776 | A | * | 10/1990 | Kitamura ..................... 310/64 |
| 5,075,585 | A |   | 12/1991 | Teruyama et al. |
| 5,323,663 | A | * | 6/1994 | Ohgi et al. ..................... 74/7 E |
| 5,325,007 | A | * | 6/1994 | Huss et al. ................. 310/180 |
| 5,629,575 | A | * | 5/1997 | Cazal et al. .................. 310/91 |
| 6,201,321 | B1 | * | 3/2001 | Mosciatti et al. ............. 310/43 |
| 6,617,716 | B2 | * | 9/2003 | Ishida ......................... 310/58 |

FOREIGN PATENT DOCUMENTS

| EP | 874444 A1 | * | 10/1998 | ............ H02K/9/22 |
| EP | 1 030 545 A1 |   | 8/2000 | |
| FR | 2 727 807 |   | 6/1996 | |
| GB | 2 059 177 A |   | 4/1981 | |

* cited by examiner

*Primary Examiner*—Joseph Waks
(74) *Attorney, Agent, or Firm*—Liniak, Berenato & White

(57) ABSTRACT

A rotary electrical machine (10), especially a motor vehicle alternator, having a stator (12) of generally cylindrical annular form, which is arranged in a casing (14) having a rear portion (16) and a front portion (18) in which the outer axial face (24) of the stator (12) and the inner axial face (30) of the casing (14) define an annular radial space (32), and the stator (12) is suspended elastically within the casing (14), wherein at least part of the annular radial space (32) contains thermally conductive resin (50) which is deformable axially and interposed radially between the casing (14) and stator (12), so as to effect radial mechanical decoupling between the stator (12) and casing (14) and so as to dissipate heat energy from the stator (12) to the casing (14).

7 Claims, 8 Drawing Sheets

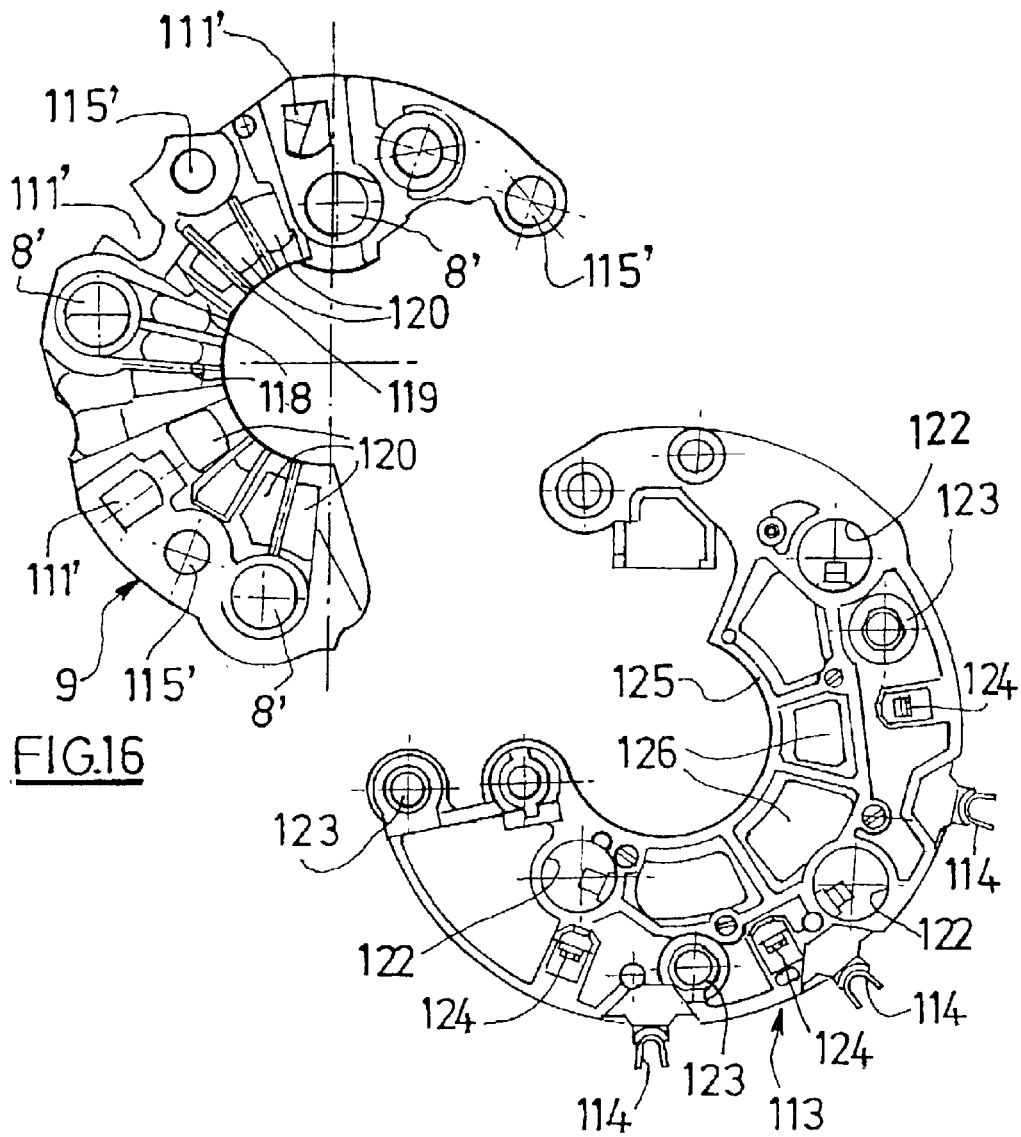
FIG.16
FIG.17
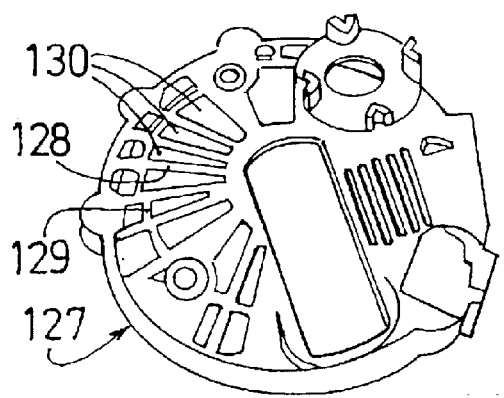
FIG.18

ROTARY ELECTRIC MACHINE, AND IN PARTICULAR MOTOR VEHICLE ALTERNATOR, COMPRISING A STATOR ELASTICALLY MOUNTED IN A HEAT-CONDUCTIVE RESIN

BACKGROUND OF THE INVENTION

1. Field of the Invention

The present invention relates to a rotary electrical machine.

In particular, the invention relates to an alternator or an alternator-starter motor which is used for supplying the electrical circuit of a motor vehicle with energy.

The invention relates to a rotary electrical machine of the type comprising a rotor, a stator of generally cylindrical annular form which is arranged within a casing comprising a rear portion and a front portion, which are joined together along a junction plane at right angles to the axis of the rotor of the machine, of the type in which the external axial face of the stator delimits, with the internal axial face of the casing, an annular radial space, and of the type in which the stator is clamped axially between the opposed radial engagement surfaces which are formed in each of the two portions of the casing, with at least one elastically deformable element being interposed and compressed axially between each of the two engagement surfaces and a portion of the facing annular radial end face of the stator.

2. Description of Related Art

A rotary electrical machine of this type is described in the document FR-A-2 727 807.

In that type of rotary electrical machine, the stator is not in direct contact with the casing, but it is insulated from it by elastomeric pads and by air. In consequence, the stator is isolated from the vibration point of view, but it does not evacuate enough of the heat which is produced when the machine is working, and the working temperature then rises above the values that can be tolerated by the components of the machine.

In addition, the pads and seals used in that machine to act as vibration dampers are of relatively complex forms, which increases the cost of manufacturing and assembling the machine.

In the case where the seal used is of the type having an L-shaped cross section, fitting it on the stator is less easy to do within the cycle time of a quantity production process.

The invention aims to propose an improvement in such a type of rotary electrical machine which does not have the above mentioned drawbacks.

SUMMARY OF THE INVENTION

With this in view, the invention proposes a rotary electrical machine of the type defined above, characterised in that at least part of the radial annular space contains elastically deformable thermally conductive resin which is interposed radially between the casing and the stator, whereby to effect radial mechanical decoupling between the stator and casing, and whereby to dissipate heat energy from the stator to the casing.

In accordance with further features of the invention:

only the front portion of the casing contains the thermally conductive resin;

an elastically deformable flat annular seal is interposed axially between the, annular front radial end face of the stator and the engagement surface formed in the front portion of the casing;

a set of elastically deformable pads are spaced apart circumferentially and compressed axially between the rear annular radial end face of the stator and a portion of the engagement surface defined in the rear portion of the casing;

each pad includes a positioning lug in the form of a dovetail which is received axially in a complementary seating formed in the rear portion of the casing.

Thanks to the invention, the elastically deformable flat annular seal and the set of elastically deformable pads are protected due to the presence of the thermally conductive resin.

In addition, the alternator is simplified because a flat annular seal replaces an L-shaped annular seal of the prior art. The pads are simplified.

The pads and the seal, in particular, provide axial vibration damping.

The resin provides radial vibration damping.

Thanks to the resin, heat is evacuated efficiently so that it is possible to increase the power output of the alternator.

Thus in one embodiment, the volume of the winding of the rotor is increased.

In one embodiment, the rectifier unit is so configured that it gives this power increase and evacuates heat well.

In one embodiment, the conductor elements of the stator are clad in a linking layer to improve heat evacuation.

The invention also provides an alternator, especially for a motor vehicle, having at least one of the foregoing features.

BRIEF DESCRIPTION OF THE DRAWINGS

Further features and advantages of the invention will appear on a reading of the following detailed description, for an understanding of which reference will be made to the attached drawings, in which:

FIG. 16 is a top plan view of the heat dissipater of FIG. 15;

FIG. 17 is a top plan view of an insulating intermediate plate of the rectifier unit of FIG. 14;

FIG. 18 is a perspective view of a cap for covering the rectifier unit of FIG. 13.

DETAILED DESCRIPTION OF THE PREFERRED EMBODIMENTS

In the following description, identical or similar components shown in the various drawings are designated by the same reference signs.

Figure 1:
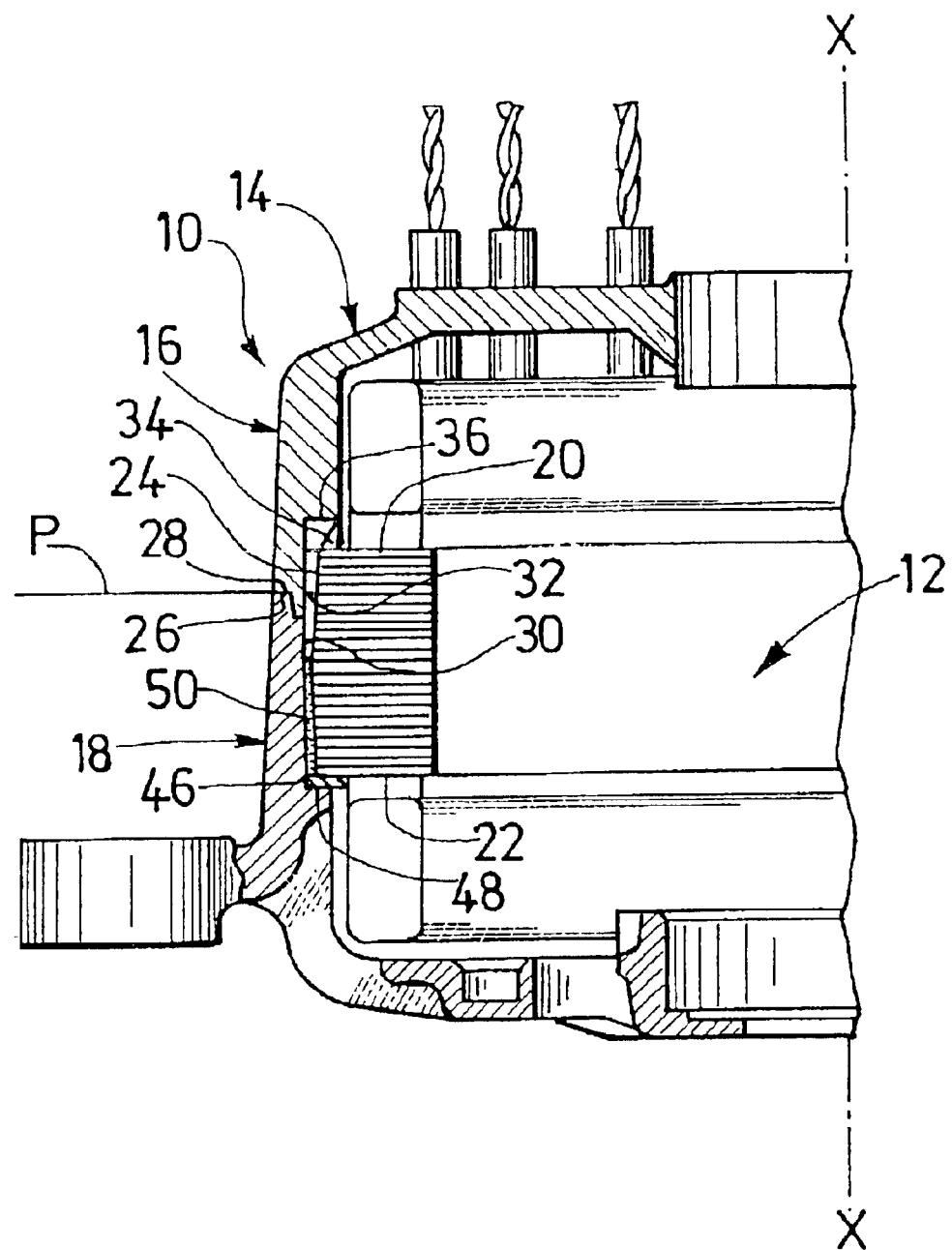
FIG. 1 is a half view in axial cross section of an alternator made in accordance with the features of the invention.
Figure 7:
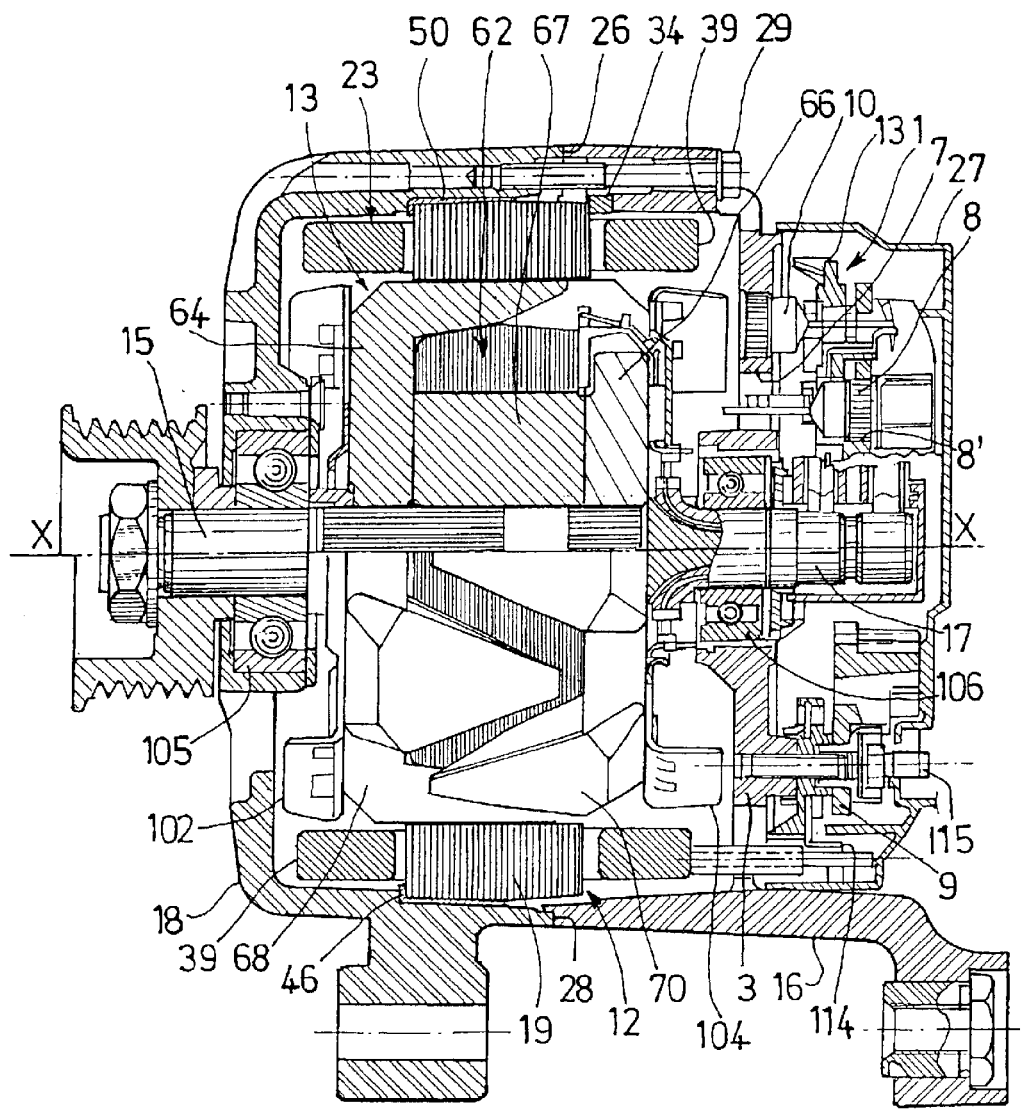
FIG. 7 is a view in axial cross section of the alternator of FIG. 1 equipped with the front portion of the casing from FIG. 6.

An orientation from back to front along the axis X—X of the alternator will be arbitrarily used, corresponding to a downward orientation in FIG. 1 and an orientation from right to left in FIG. 7. The axis X—X is both the axis of axial symmetry and the axis of rotation of the alternator.

FIG. 1 shows a motor vehicle alternator 10 which consists essentially of a stator 12 mounted in a casing 14 which comprises a rear portion 16 and a front portion 18, together with a claw-type rotor (not shown in FIG. 1).

In the conventional way, the rotor is mounted for rotation within a cylindrical annular chamber defined within the stator 12.

The stator 12 surrounds the rotor and comprises a body consisting of a stack of grooved laminations carrying a multiphase armature winding. The body has a generally cylindrical annular form delimited by two annular radial terminal surfaces, namely a rear surface 20 and a front surface 22, and by a cylindrical outer surface 24. The grooves in the body are, in the known way, of blind and half closed form. These grooves are open at the inner periphery of the body of the stator.

The two portions 16 and 18 of the envelope or casing 14 that receives the stator 12 are two moulded and machined members, each of which receives a bearing (not shown in FIG. 1) for mounting the shaft of the rotor for rotation therein. In FIGS. 1 and 7 the portions 16, 18 are metallic, being made of aluminium.

The two portions 16, 18 of the casing 18 are commonly called the rear bearing 16 and front bearing 18 respectively. Each of these portions has a machined annular radial terminal face 26, 28, and these faces define a junction plane P of the two portions 16, 18 of the casing 18, along which they are held axially by means of a set of four clamping screws (not shown in FIG. 1), which are spaced apart circumferentially at regular intervals about the axis X—X of the alternator 10.

The outer cylindrical surface 24 of the stator 12, with the inner cylindrical surface 30 of the casing 14, delimits a radial annular space 32.

The stator 12 is suspended elastically within the casing 14, consisting of its two portions 16, 18, for reduction of noise, especially magnetic noise.

In accordance with an arrangement known in the state of the art, the stator 12 includes at the rear a set of elastic pads 34 in the form of blocks which, in this example, are four in number and are spaced apart circumferentially at regular intervals about the axis X—X, in such a way that they are interposed axially between a portion of the radial annular rear end face 20 of the stator 12 and a radial annular rear engagement surface 36, which are formed in facing relationship in the portion, in the form of a cylindrical sleeve, of the rear portion 16 of the casing 14.

Figure 2:
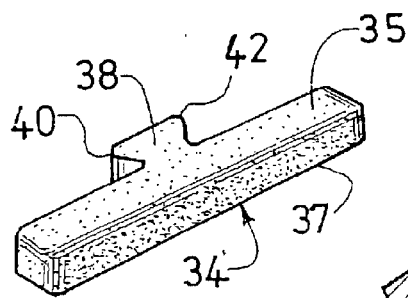
FIG. 2 is a perspective view showing a damping pad in the alternator of FIG. 1.

FIG. 2 shows one example of the pad 34, which is simplified as compared with that in the prior art.

Each pad 34 in this example is a block having a general form of a rectangular parallelepiped defining two parallel and opposed engagement faces 35 and 37, each of which bears respectively against a facing portion of the radial annular rear end face 20 of the stator 12 and against the radial annular engagement surface 36 which is machined in the rear portion 16 of the casing 14.

Each pad 34, in the form of a rectangular block, is extended laterally by a positioning lug 38 of dovetail form which has two axial edges 40, 42.

Figure 3:
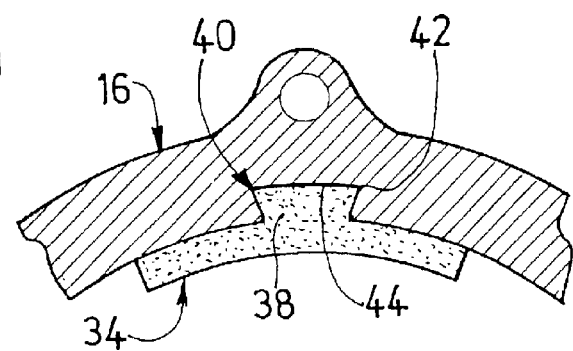
FIG. 3 is a scrap view in transverse cross section, showing the mounting of the damping pad of FIG. 2 in a complementary seating in the casing of the alternator.

The positioning lug 38 is received axially in a complementary seating 44 formed in the cylindrical skirt portion of the rear portion 16 of the casing 14, as can be seen in FIG. 3.

The positioning lug 38 is formed integrally in one piece.

The stator 12 includes at the front an elastically deformable annular flat seal 46, which is interposed axially between a portion of the radial front annular end face 22 of the stator 12 and an annular radial engagement surface 48, which is formed in facing relationship in the cylindrical skirt portion of the front portion 18 of the casing 14.

The flat seal 46 advantageously replaces a seal of L-shaped cross section in the prior art.

The pads 34 and the annular seal 46 are made of axially compressible material, for example elastomer or rubber.

After being tightened up, and as is shown in FIG. 1, the pads 34 and the annular seal 46 are compressed axially between the annular radial end faces 20, 22 of the stator 12 and the engagement surfaces 36, 48 associated with the portions 16, 18 of the casing 14, the annular end surfaces 26 and 28 of the casing 14 being gripped in contact on the junction plane P.

Figure 4:
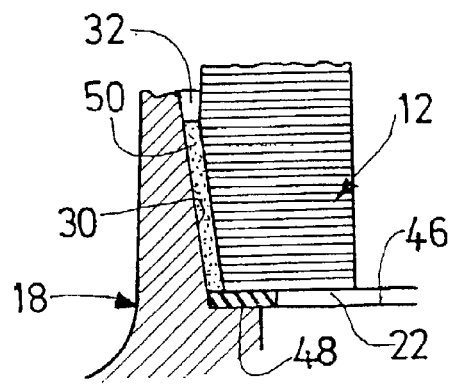
FIG. 4 is a detail view from FIG. 1, showing that portion of the annular radial space in the stator that contains the thermally conductive resin.

In accordance with the features of the invention, and as can be seen in the detail view in FIG. 4, the annular radial space 32 contains resin 50, or adhesive, which is elastically deformable and conductive of heat, and which is interposed radially between the outer cylindrical surface 24 of the stator 12 and the inner cylindrical surface 30 of the front portion 18 of the casing 14.

Preferably, only the lower portion, or front portion, of the radial annular space 32 is filled with the resin 50. The resin is thus spaced away from the rectifier unit of FIG. 14, and is thereby protected.

The resin 50 must be able to deform elastically in the radial direction, so as to give mechanical radial decoupling between the stator 12 and casing 14.

It is also clearly possible to envisage that the resin 50 be placed on the rear portion of the annular radial space 32.

Thus, the resin 50 damps radial vibrations emitted by the stator 12 during its operation, so as to prevent them from being transmitted to the casing 14 and emitting noise.

The resin 50 also improves the dissipation of thermal energy emitted by the stator 12 towards the casing 14. In this connection, the thermally conductive resin 50 conducts heat better than air or the elastomeric materials of the pads 34 and seal 46. It therefore improves the evacuation of heat by the alternator 10 from the stator 12 to the casing 14.

The said resin simplifies the pads 34 and enables a flat seal 46 to be provided. The pads and the seal damp out axial vibrations.

The assembly of the various components of the alternator 10 is carried out in the following way.

Figure 5:
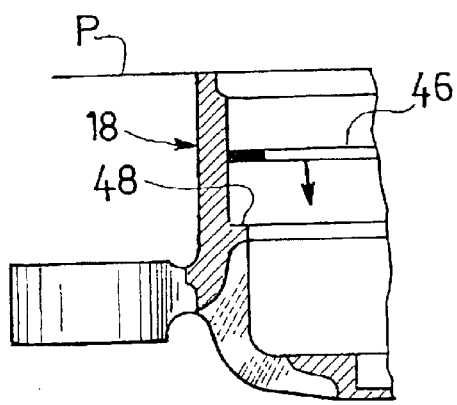
FIG. 5 is a view similar to FIG. 1, showing the positioning of the flat annular seal in the front portion of the casing of the alternator.
Figure 6:
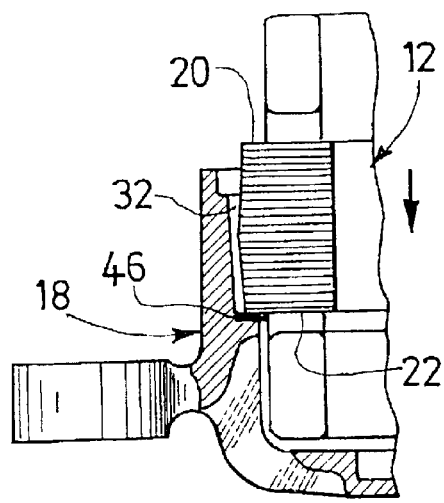
FIG. 6 is a view similar to FIG. 1, showing the positioning of the stator in the front portion of the casing of the alternator, before the thermally conductive resin is caused to flow into the radial annular space and before the rear portion of the casing is fitted.

The flat annular seal 46 is positioned in the front portion 18 of the casing 14, with the open face of the latter being preferably oriented upwards as in FIG. 5.

The stator 12 is then put in place in the front portion 18, with its annular front radial end face 22 in axial engagement against the seal 46.

Preferably, a centring tool of known type is used to position the stator 12 coaxially with the bearings of the casing 14.

In addition, the four pads 34 are positioned in the corresponding seating 44 of the rear portion 16 of the casing 14.

To this end it is possible to arrange that the transverse dimensions of the positioning lugs 38 shall be slightly greater than the width of each seating 44, so as to maintain the lug 38 in position in the seating 44 by slight compression of the material of the lug 38.

Thermally conductive resin 50 or adhesive material is then flowed into the radial annular space 32 until the depth of the resin 50 reaches for example three quarters of the depth of the cylindrical skirt of the front portion 18 of the casing 14.

It will be noted that the flat annular seal 46 hermetically seals the front axial end of the radial annular space 32, which prevents the resin 50 from flowing out of the radial annular space 32, for example towards the front of the casing 14.

The resin 50 is then polymerised in such a way that it will be axially deformable and no longer flow.

It will be noted that after being polymerised, the resin 50 centres the stator 12 and immobilises it radially.

The rear portion 16 of the casing 14 is then put in place on the front portion 18 with the engagement faces 34 of the pads 34 in contact against the radial annular rear end face 20 of the stator 12, so as to achieve the final assembly shown in FIG. 1.

In various modified embodiments (not shown) of the invention, the resin 50 may be injected into the radial annular space 32 using several known techniques.

For example, an injection hole may be provided in the cylindrical skirt of one of the portions 16, 18 of the casing 14, to enable resin 50 to be injected after the rear portion 16 has been mounted on the front portion 18.

This invention may of course also be used for motor vehicle alternators of the type described above but having a wound stator, with conductors of large diameter in the form of bars. Such a stator winding is described for example in the document WO92/06257. Conductors in the form of bars well fill the slots of the stator body, and are generally in the form of hairpins, preferably of round or square or rectangular cross section. Conductors in the form of bent bars may for example, with advantage, replace the hairpins.

Thanks to the invention, a wound stator of this type with large conductors in the form of bars is easy to cool.

The arrangement of the stator in the casing 14 according to the invention is applicable with advantage to motor vehicle alternators or to those electrical machines of the "alternator-starter" type which are known per se and which are adapted to operate alternately as starter motors and as alternators. For more details, reference should be made to Application FR-00 03131 filed on 10, Mar. 2000.

Thanks to the invention it is possible to increase the power of the alternator because the thermally conductive resin evacuates heat so well.

FIG. 7 shows the compact alternator 10 with internal fans 102, 104.

This alternator, which in this example is of the multiphase type, consists mainly, as in FIG. 1, of a casing 14 consisting of two portions 16, 18 with openings for flow of air. The casing 14 carries, as in FIG. 1, two internal main members which consist of the stator 12 and rotor 13, as described for example in the document U.S. Pat. No. 527,605 (EP-B-0 515 259), to which reference should be made for more detail.

The stator 12 surrounds the rotor 13, which is fixed to a shaft 15, on the rear end of which two slip rings 17 are fixed, while a pulley (not given a reference numeral) is fixed to the front end of the shaft 15. This pulley is arranged to receive a belt which is part of a motion transmitting device driven by the internal combustion engine of the motor vehicle. The axis X—X is the axis of the shaft 15.

The stator 12 comprises a body 19, which in this example consists mainly of an axial stack of transverse soft iron laminations. As mentioned above and as is known per se, each of the laminations of the stator 12 has notches to define slots which in this example are axial. These slots, one of which can be seen partly at 25 in FIGS. 8 and 9, are open at the outer periphery of the body 19, which is of cylindrical form.

The slots extend radially outwards and receive electrical conductive axial tails of an electrical armature winding 23. The slots are half closed on the inside, as can be seen for example in the document FR-A-2 603 429.

Figure 8:
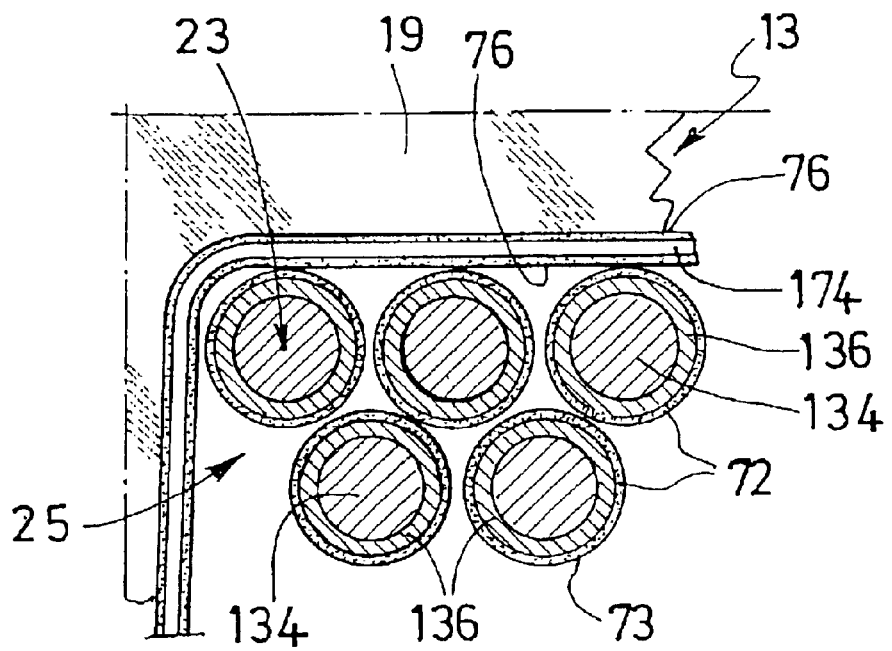
FIG. 8 is a large scale view in axial cross section of a winding of conductor elements which are coated by being clad in a connecting layer.
Figure 9:
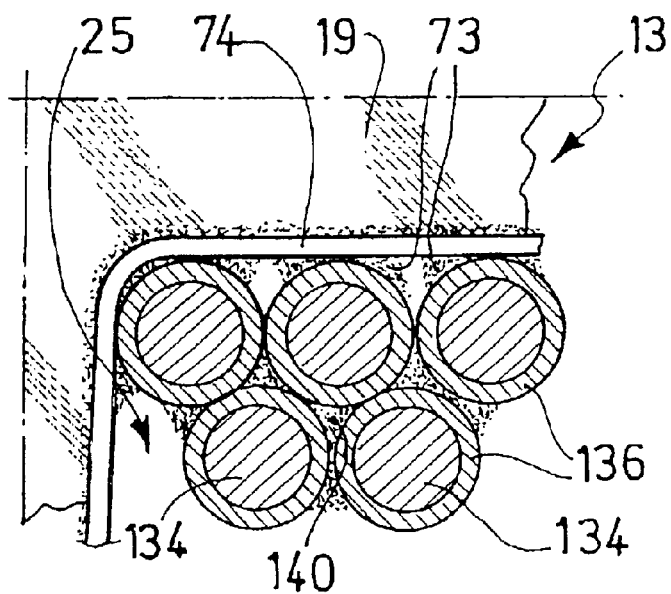
FIG. 9 is a view similar to FIG. 8 after the connecting layer has filled the interstices that exist, so joining the conductor elements together.

The electrical winding 23, which can be seen on a larger scale in FIGS. 8 and 9, consists, for each phase of the alternator, for example of the spiral winding of an electrically conductive wire, which is a copper wire here and which is coated with at least one layer of electrically insulating material 136, which is for example a polyester consisting of two layers, one of which is of the polyimide type and the other of the polyamide imide type.

An electrically insulating leaf 74 is interposed in each slot 25 between the electrical winding 23 and the body 19 of the stator 13.

This leaf 24, which is immobilised in a way to be described later herein in order to reduce noise and the sound level of the alternator 10, enables the dangers of short circuiting between the winding 23 and body 19 to be reduced or eliminated.

The operation of winding the electrically conductive wire therefore results in the winding 23 comprising, in each slot 25, a bundle of electrical conductor elements 134 which pass axially through the slots 25 and are extended outside the body 19 of the stator 12 by junction tails, which form ears 39 that project on either side of the body 19 as shown in FIG. 7.

In another version, hairpins of circular or rectangular cross section are used, being mounted in the axial slots 25 of the stator 12 as described in the document WO-92/06527. In a further version, four electrically conductive elements are mounted radially, being superimposed on each other in each slot.

The inductor rotor 13 in this example is a claw-type rotor of the Lundel type, which consists of a cylindrical electrical winding 62 which is mounted between two metal plates 64 and 66, each of which includes claws 68 and 70 respectively, which extend axially towards the other plate 66 and 64. Each assembly of plate and claws constitutes a pole wheel, of magnetic steel in this example. A core 67, which in this example is also of magnetic steel, is interposed axially between the plates 66, 64 to carry the winding 62. The core 67 is of annular form and is oriented axially, being in this example in the form of a thick annular ring. The core 67 is separate from the pole wheels, so as to facilitate winding of the electrically conductive element on the core 67 without the claws 68, 70 interfering. Each pole wheel is fixed on the shaft 15 by means of knurled portions of the shaft, one of which serves for fastening of the core 67. The claws 68 and 70 are offset circumferentially from each other so that a claw 68 of the plate 64 is interposed between two adjacent claws 70 of the plate 66 and vice versa. The claws have chamfers for reducing magnetic noise. For more details, reference should be made to the document EP-B-0 515 259. These chamfers have not been given reference numerals, in the interests of simplicity in FIG. 7.

The alternator in this example is, like that in the document EP-B-0 515 259, arranged with internal ventilation, each plate 64, 66 carrying a fan 102, 104 respectively adjacent to the portion 16, 18 concerned of the casing. Each portion 18, 16 of the casing 12 has openings for flow of air, and carries a central bearing in the form of a ball bearing 105, 106 respectively, to support the front and rear ends respectively of the shaft 15. Thus, one of these portions 16, 18 is called the front bearing (i.e. the one adjacent to the pulley), while the other is called the rear bearing. It will be noted that the said pulley is secured by means of a nut on the threaded front end of the shaft 15. In the upper part of FIG. 7, a spacer of L-shaped cross section is interposed between the inner ring of the bearing 105 and the pulley. In the lower part of FIG. 7, the spacer is incorporated in the pulley, which reduces axial size still further.

The bearings 16, 18 are of hollow form, and each of them has a base in the form of a radial plate oriented transversely with respect to the axis X—X of the alternator, and at their outer periphery they have an axially oriented annular flange, each of which includes the corresponding machined radial annular end face 26, 28 which delimits the junction plane indicated by the reference P in FIG. 1.

Each axially oriented flange is joined at its other axial end to the transversely oriented radial plate which carries the central ball bearing 105, 106 concerned. In a known way, each radial plate and each flange has openings for circulation of air. In FIG. 7 there can be seen some of the openings formed in the radial plates of the bearings 16, 18, and two openings in the peripheral flanges of the bearings 16, 18 are indicated in broken lines.

The openings in the flanges are located facing the ears 39.

The fans 102, 104 are located radially inwards of the ears 39, being fixed, for example by spot welding, to the plate 64 and plate 66 respectively. These fans 102, 104, fixed to the rotor 13, have blades which are preferably spaced apart at irregular intervals to reduce noise, and are in this example of the centrifugal type. In this way, air is aspirated and passes through the openings in the radial plates so as to be passed through the openings, which in this example are of oblong form, in the peripheral flanges.

The fans may have two sets of blades in the manner described in the document FR00 08549 filed on 30, Jun. 2000.

More precisely, the second set of blades is shorter than the first set of blades, and at least one second blade is interposed between two consecutive blades of the first set of blades.

For more detail, reference should be made to the said document. All the versions in that document may be envisaged. Thus a cover plate may overlie the first set of blades.

The ears 39 are thus well cooled, as are the rectifier unit 1, the voltage regulator which is part of the alternator 10, and the ball bearings 105, 106.

The rear bearing 18 carries a unit 1 for rectifying the alternating current produced by the winding 23 of the stator 12 which in this example is three-phase, together with a brush carrier which co-operates with the slip rings 17. The unit 1 converts the alternating current produced by the winding 23 into uni-directional current for recharging the battery of the vehicle and supplying the power consumers such as the lighting apparatus, the air conditioning apparatus etc.

In the known way, the slip rings 17 are connected to the ends of the winding 62 of the rotor 13 through wire connections passing behind the fan 104, as can be seen in FIG. 7.

A protective cap 27 is also provided, and is formed with openings in a manner to be described later herein, for circulation of air.

The cap 27, which in this example is of plastics material, overlies the brush carrier which is connected in the known way to a voltage regulator 116, and the rectifier unit which includes diodes.

The brushes of the brush carrier are in frictional cooperation against the slip rings 17. The regulating device limits the voltage supplied by the stator, in particular to protect the battery.

The bearings 16, 18 include lugs for fastening them on a fixed part of the vehicle, and are fastened together, in this example with the aid of screws one of which can be seen at 29 in FIG. 7. The alternator of the vehicle is thus connected electrically to earth via its bearings 16, 18.

In another version, the radial plates of the bearings are inclined axially.

In a further version, the fan 102 is omitted, given that the rear fan is more powerful.

In general terms, the alternator includes at least one internal fan 13 fixed to the rotor and located inside the casing 14 under an ear 39, in such a way that the winding 23 is well cooled and the alternator is of high power while being compact, especially in the axial direction, and is also quiet.

In another variation, a single fan is arranged on the outside, in the region of the pulley.

The resin 50 according to the invention provides the facility for evacuating more heat through the metallic bearings 16, 18, which in this example are of aluminium, and this enables the power from the alternator to be increased, in particular by increasing the volume of the winding 62 in a manner to be described later herein. This increase in power makes it necessary to configure the rectifier unit 1 and the windings 23 and 62 in a way which will be described below.

Thus, in accordance with one feature, it is proposed, for the windings 23 and 62 of the stator 12 and rotor 13 respectively, to make use of an electrically conductive wire, in this example of copper, which is spiral wound. The conductive wire is, as mentioned earlier herein, pre-coated with a layer 136 of electrically insulating material which is clad in a layer 72 for connection or fastening, and which includes at least one linking material 73 which links together the coated electrically conductive elements 134 adjacent to the bundle of the winding 23.

FIG. 8 is a partial transverse cross section of an electric winding 23 of a stator 13 made in accordance with this feature. In this Figure, a plurality of electrically conductive elements 134 can be seen, which are formed by winding the conductor wire to make the winding 23.

In accordance with another feature, the electrically insulating leaf 74 comprises an electrically insulating structural element 174, such as paper or insulating fabric, at least one of the faces of which is at least partially coated with a linking material 76. For example, only the face which faces towards the turns of the winding 23 is at least partly coated with a linking material 76. Preferably, both faces of the structural element are coated with a linking material 76, this being chemically compatible with the first linking material.

The linking material 73 of the linking layer 72 with which the layer 136 of the conductor elements 134 is clad is, in one embodiment, identical to the linking material 76 with which the insulating leaf 74 is coated.

In another version, the linking materials 73 and 76 are chemically and thermally compatible with a view to optimising their specific function. The material 76 is accordingly chosen to give a good connection with the body 19, and the linking element 73 is chosen to give good filling qualities, improved by the presence of the linking element 76.

The structural element 174 may also be impregnated with the linking material 76. Thus, where the structural element 174 is of fabric or is an equivalent non-fabric element, the linking material 76 overlies its faces and penetrates at least partly between the fibres of which the structural element 174 consists.

The linking materials may for example comprise a polymer.

The polymer may be of the thermosetting type which retains its mechanical characteristics after being polymerised, at least up to the maximum working temperature of the alternator 10, or it may be of the thermoplastic type, the melting point of which is higher than the maximum working temperature of the alternator 10.

Given that the linking material 73 coats the conductor elements 134 which are coated with the layer 136 of electrically insulating material, the step of impregnating the electrical windings 23 and 62, in the process for making the stator 12 and rotor 13 of the alternator 10 in the state of the art, is eliminated, which enables the manufacturing time of the alternator to be reduced by several minutes or even several tens of minutes.

The use of varnish gives rise to emissions of pollutant vapour, in particular while it is being heated. The use of different linking materials 73, 76 on the coated conductor elements 134 enables the use of varnish to be eliminated and enables polluting emissions into the atmosphere to be reduced or even eliminated.

In the remainder of this description, the linking material 73 of the layer 72 and the linking material 76 will be taken to be identical.

The method of manufacturing the alternator 10 accordingly proposes that the step of winding the coated and clad electrically conductive wire be followed by a step of changing the state of the linking material which causes it to become softened or to melt, in order at least partially to fill the interstices 140 that exist between the adjacent portions of the conductor elements 134, and which then cause it to solidify once more and connect the adjacent portions of the conductor elements 134 together.

The step of changing state corresponds to a modification of the structure of the linking material, that is to say a movement of some of the atoms of which it consists, with respect to each other.

In a first embodiment of the invention, the step of changing the state of the material comprises a step of heating the linking layer 72 to a curing temperature which is higher than or equal to the melting point of the linking material, so as to cause it to melt or soften in order that it flows or runs whereby to fill, preferably almost entirely, the interstices 140 that exist between the adjacent portions of the conductor elements 134.

The heating step is followed by a cooling step, in the course of which the linking material sets or solidifies once more.

The hardening or solidifying temperature of the linking material is the temperature starting from which the structure of the material is modified whereby the material permits the elements with which it is at least partially in contact to become connected.

Thus, where the polymer is of a thermosetting type, its reticulation temperature will be called the hardening temperature in the remainder of this description and in the claims.

Also, where the polymer is of a thermoplastic type, its melting point will be called its hardening temperature in the remainder of the description.

Where the linking material is a polymer, the heating and cooling steps permit its polymerisation and solidification, which ensure the rigid linking of the adjacent coated conductor elements 134 between and with the insulating leaf 74, which is preferably a conductor of heat like the resin 50 so as to evacuate still more heat.

Where the insulating leaf 74 is coated with a linking material 76 such as a polymer, the steps of heating to a temperature greater than or equal to the hardening temperature of the linking material 76, and of cooling, enable it to become connected to the body 19 of the stator 13 and enable its connection with the adjacent portions of the coated conductor elements 134 to be reinforced.

Since the linking material is spaced apart at substantially regular intervals on the layer 136 of electrically insulating material and on, and/or in, the structural element 174, its melting or softening during the rise in temperature leads to filling, preferably homogeneously, of the interstices 140 that exist between the adjacent portions of the coated elements 134, and between the adjacent portions of the coated elements 134 and the insulating leaf 74. Thus, after the linking material has been heated to a temperature greater than or equal to the hardening temperature of the linking material 76, during its cooling and solidification, the adjacent portions of the element 134 and the insulating leaf 74 are strongly joined together and form a rigid whole. The leaf 74 can therefore be made thin.

The insulating leaf 74 and the layer of electrically insulating material are of course so selected as to be resistant to the heating step.

The linking material then covers the winding 23, preferably integrally, thereby protecting it against pollutants from outside such as dust. It also ensures that the elements 134 are mechanically held and stiffened.

The linking material also gives improved conduction of heat, which is favourable in combination with the thermally conductive resin 50 in accordance with the invention.

The face of the insulating leaf 74 which is in contact with the wall of the axial slot 25 may be covered with the linking material 76. Thus, after heating of the linking material 76 to a temperature greater than or equal to the hardening temperature, cooling and solidification of the linking material 76 causes the body 22 of the stator 12 and the insulating leaf 74 to become strongly connected together and to form a rigid whole.

The invention also proposes, in conjunction with the cooling step, to reform in a predetermined manner the electrical windings 23 and/or 62 by means of a forming tool 78 which exerts a force on at least one zone of a winding 32, 62 in such a way as to deform it, Thus, when the cooling step has finished, the electrical windings 23 and/or 62 have a predetermined form which is irreversible at the working temperatures of the alternator 10.

The application of force on at least one zone of a winding 23, 62 may with advantage start before or during the heating step, to last until setting or solidification of the linking material 76.

Figure 10:
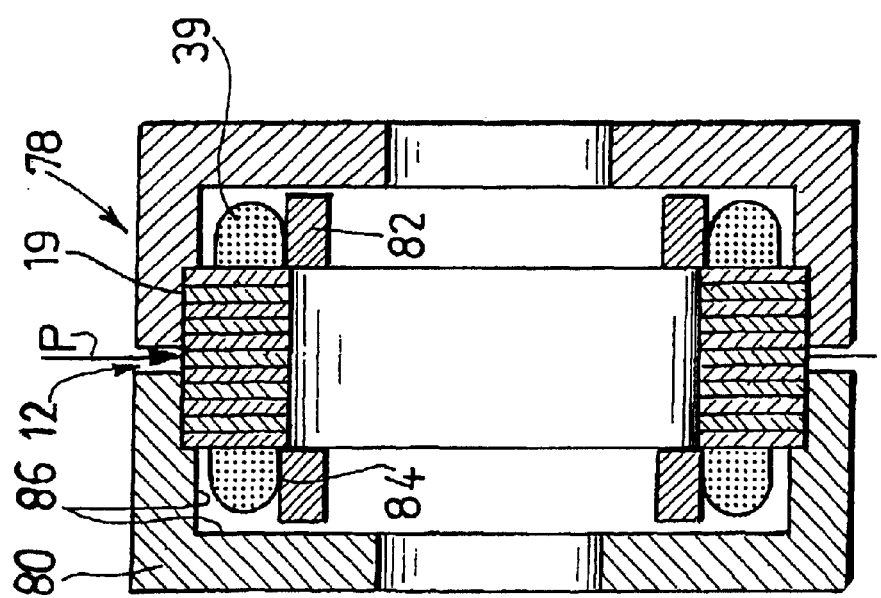
FIG. 10 is a view in cross section of the stator of FIG. 7 placed in a forming tool.

Thus, at the end of the winding step, the stator 12 is placed in a forming tool 78 shown in FIG. 10.

The forming tool 78, which is preferably made of a thermally and electrically insulating material, is symmetrical with respect to a transverse mid-plane P. In the remainder of this description only the left hand part of the forming tool 78 will be described with respect to the mid-plane P, and with reference to FIG. 10.

The forming tool 78 comprises a first fixed external peripheral die 80 in which the body 19 of the stator 12 is centred. A second, internal, die 82 is movable in a radial direction. The first die 80 is in two parts so as to come into contact with the ends of the body 19 and to immobilise the latter axially.

Figure 11:
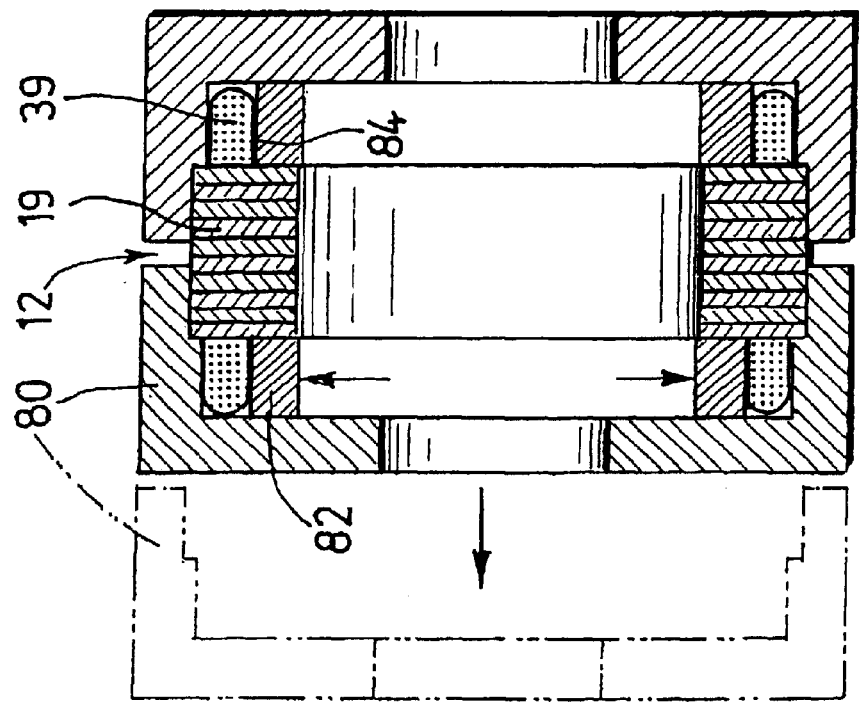
FIG. 11 is a view similar to FIG. 10, in which the forming tool has deformed the ears of the stator.

The second die 82 enables a force to be exerted on the annular axial face 84 of the ear 39. It then compresses the portions of the coated and clad electrical conductor elements 134 that constitute the ear 39, against the internal faces 86 of the first die 80 as shown in FIG. 11. This second die 82 is also in two parts, which are movable radially with respect to each other in opposite directions.

Subsequently, the linking material is heated to a temperature greater than or equal to its hardening temperature in such a way as to cause it to melt or soften, and to harden or polymerise, in particular where the material is a polymer. Putting the ears 39 associated with the filling of the interstices 140, in particular by the linking material 73 of the linking layer 72, under stress, enables the portions of the elements 134 to be clamped as shown in FIG. 9, and gives modification of the outside dimensions of the ears 39 of the stator 12.

The form of the ear 39 then corresponds to its optimum form which enables the size of the stator 12 to be minimised in the alternator 10, and accordingly enables the size of the latter to be reduced.

During the heating and/or cooling steps, the optimum form of the stator 12 is fixed in a way that is not reversible at the working temperatures of the alternator 10.

Thus, the exact dimensions of the stator 13 are determined precisely, and they are reproducible in quantity production.

The second die 82 then ceases to exert a force on the ear 39, and the forming tool 78 is then opened so that the stator 12 can be removed.

Control of the dimensions of the stator 12 enables dangers of frictional contact between the portions of the coated electrical conductor elements 134 on the casing 14 of the alternator 10 to be eliminated, and therefore also eliminates wear of the layer 136 and dangers of short circuits occurring.

It will be appreciated that the ears 39 may come very close to the front and rear bearings, respectively, of the casing 12, with their openings, by virtue of the second dies 82 of FIGS. 10 and 11. This enables the size of the casing 14 to be reduced, and therefore saves material as well as reducing size. All combinations are of course possible, with at least one of the windings of the stator 12 and rotor 13 being clad with a linking layer 72. The rotor 13 may, in another version, be a projecting pole rotor and have more than one winding.

Similarly (FIGS. 12 and 13), the outside dimensions of the winding 62 of the rotor 16 are determined by a forming tool 93. This forming tool 93 accordingly also comprises a first die 95 in two parts, and a second die 98, which this time is radially on the outside, being in two parts which are movable radially with respect to each other, this time along the axis of the shaft 15.

The first die 95 immobilises the core 67, with its parts disposed on either side of the core 67 in contact with the axial ends of the latter. The first die 95 consists of two transverse plates which are disposed on either side of the core 67. These plates have a thickened portion on their radial periphery for the purpose of centring the core 67 and defining a clearance between the plates and the winding.

The forming tool is thus able with advantage to give a particular form to the winding 62 so that the latter will be adjacent to the claws 68, 70 and the plates 64, 66. The second die 98 is accordingly in two parts, each of which has a hollow internal form, V-shaped in this case, so as to increase the size of the winding 62 and therefore the power from the machine. This is made possible due to the presence of the resin 50 provided in accordance with the invention, which enables heat to be evacuated and therefore the pads 34 and the seal 46 to be protected.

Figure 12:
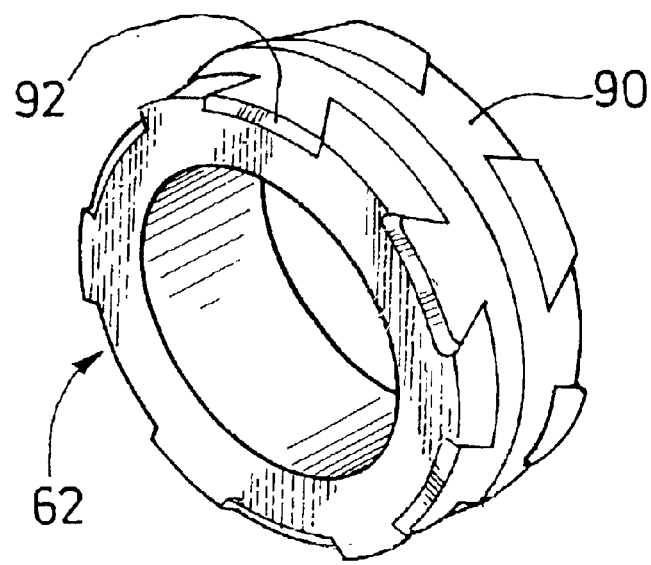
FIG. 12 is a perspective view of the forming tools for the winding of the rotor of FIG. 7.

FIG. 12 shows the winding 62 of the rotor 16. Its annular outer peripheral face 90 is convex, and in this example it has a V-shaped profile, though in another version it may be barrel-shaped to increase the volume of the winding 23. In addition, the winding 62 has rebates 92 which are made by the forming tool during the heating step and/or the cooling step, the tool being movable radially so as to optimise the size of the winding 62. In this connection, the rebates 92 permit the claws 68 and 70 of the plates 64 and 66 to pass. Thus the volume of the winding 62 can be increased without the total size of the rotor 13 being modified. In this way the output of the alternator 10 is increased.

Figure 13:
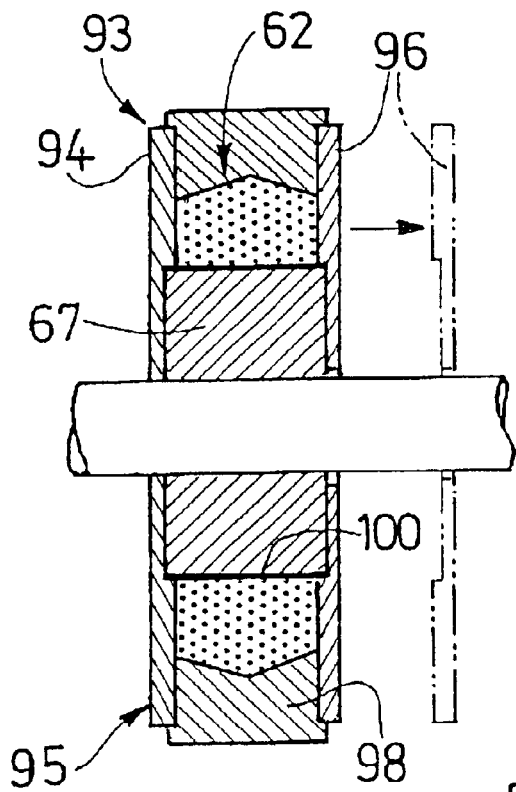
FIG. 13 corresponds to FIG. 12 but is in axial cross section.

The foregoing process also permits elimination of the winding wire which a conventional rotor carries for supporting the winding 62, as well as increasing the size of the winding. In this connection, during the winding step, the coated and clad electrical conductor element 134 can be guided transversely by the two transverse plates 94 and 96 which determine the width of the winding 62, as shown in FIG. 13. The two transverse plates 94 and 96 hold the coated and clad electrical conductor element 134 until the end of the cooling step, after the linking element 76 has been heated to a temperature higher than, or equal to, its hardening temperature. The second die 98 exerts a radial force on at least one axial annular zone of the winding 62, so as to deform it whereby to determine its external form, and in particular its diameter. The transverse plate 94, 96, together with the die 98, are then withdrawn axially.

Similarly, it is possible to deform at least one of the zones of at least one of the ears 39, so as to determine its external form.

A radial annular zone of the winding 23 may be deformed in such a way as to produce a hollow the form of which is complementary to an axial element (not shown) which extends, on an internal face of a transverse wall of the casing 14, towards the stator 12. Such a recess then enables the axial dimensions of the alternator 10 to be reduced, and therefore enables its overall size to be reduced.

The winding 62 in this example is formed directly on the core 67. The heating and cooling steps enable the linking material to connect the winding 62 to the core 67.

The winding 62 may also be formed on an intermediate member from which it is separated after its linking material has hardened. It is then assembled by being clamped on the core 67.

Elimination of the winding body firstly enables the number of components of the rotor 13 to be reduced, which reduces its manufacturing cost, and also increases heat transfer between the winding 62 and the outside, thereby increasing the output of the alternator 10.

The increase in heat transfer also reduces the need to cool the alternator 10, and consequently enables the dimension of the cooling blades of the front fan 102 and rear fan 104 shown in FIG. 1 to be reduced, or even enables at least one of these fans, namely the front fan 102 and rear fan 104, and in particular the front fan 102, to be omitted.

Elimination of the winding body also enables, either the volume of the rotor 13 to be reduced while retaining the same power for the alternator 10, or the power of the alternator 10 to be increased by increasing the dimensions of the winding 62 while retaining the volume of the rotor 13. This power increase is possible due to the thermally conductive resin 50 provided by the invention.

The rear ear 39 may be longer than the front ear 39.

In order to reduce or eliminate the dangers of occurrence of short circuits between the winding 62 and core 67, and/or to improve the connection between them, it is of advantage to interpose between these two elements a leaf 100 of electrically insulating material similar to the insulating leaf 74 of the stator 13. The leaf 100 of electrically insulating material is thinner than the winding body of the prior art and is preferably coated or impregnated at least partially with a linking material which may be identical with the linking material 76. Preferably, the two faces of the leaf 100 are coated with a linking material in such a way that the linking material also connects the winding 62 and core 67 together. The linking material for the leaf 100 is then preferably of the thermoplastic type, having a melting point which is higher than the maximum working temperature of the machine, though it may be of the thermosetting type with the advantage that this enables the reliability of the machine to be increased. As mentioned above, the linking material is a polymer.

Preferably, the leaves 74, 100 are thermally conductive so as to favour evacuation of heat towards the body 19 and core 67 respectively. These leaves are thin.

In a modified embodiment, the method enables the volume occupied by the windings 23 and 62 to be reduced, which reduces their volume. In consequence, it reduces the emission of wind noise when the alternator 10 is working.

The stiffness of the linking material 73, 76 which is used is preferably smaller than that of the varnish which is used in the state of the art. This enables the thickness of the assembly consisting of at least one of the windings 23, 62 and the elements to which it is connected by the linking material 73, 76 to be reduced, which, in particular, reduces magnetic noise emitted by the alternator 10 while resisting mechanical stresses, in particular those due to vibration.

In addition, the linking material 73, 76 which is used is preferably insensitive to temperature variations within the range of working temperatures of the alternator 10. Thus, the level of magnetic noise emitted by the alternator 10 is substantially constant when the alternator 10 is operating.

The process also enables variations in the dimensions of the windings 23 and 62 of the stator 12 and rotor 12 to be reduced. It is thus possible to reduce working clearances between the winding 62 and the plate 64, 70 and the claws 68, 70 respectively, together with the clearances between the stator 13 and the fans 102, 104 respectively. In this way, the clearances are made small.

The process also enables working clearances that exist radially and axially between the ears 39 of the stator 13 and the casing 14 respectively to be reduced.

Thanks to the above mentioned process, the overall size of the alternator can be reduced but with an increase in power and good evacuation of heat by virtue of the resin provided in accordance with the invention.

Hardening of the linking material is obtained by the heating step which can consist in heating the linking material by stoving, so as to bring its temperature up to a temperature greater than or equal to its hardening temperature.

In a modified version, the heating step consists in heating the coated and clad electrical conductor element 134 by Joule effect, so as to bring the temperature of the linking material to a temperature greater than or equal to its hardening temperature. The temperature must be high enough, and the heating step must last sufficiently long, for the linking material 76 with which the insulating leaf 74, 100 is coated also to attain its hardening temperature. This is for example achieved by causing a current to flow in a sufficiently high intensity in the electrical conductor of the winding 23 and/or 62 to cause heating to take place. The temperature of the conductor element must of course in all cases remain lower than a maximum temperature, so as not to damage the layer of electrically insulating material 136.

This increase in power of the machine makes it necessary to reform the rectifier unit 1.

Figure 14:
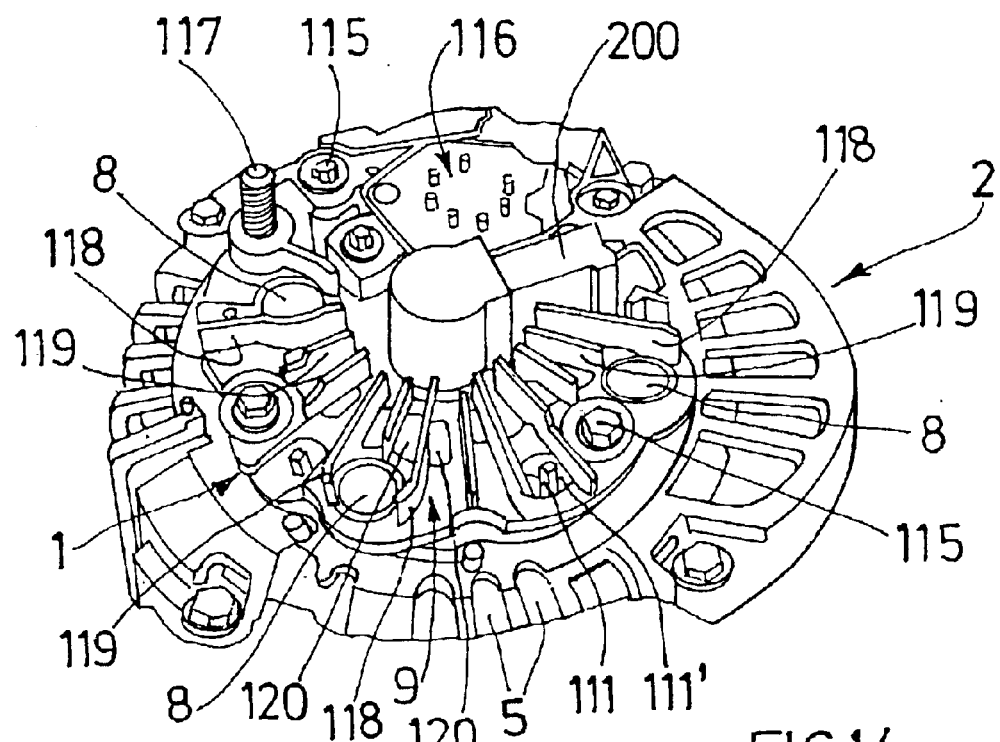
FIG. 14 is a partial view in perspective, of a rectifier unit arranged to be mounted on the rear portion of the alternator of FIG. 7.
Figure 15:
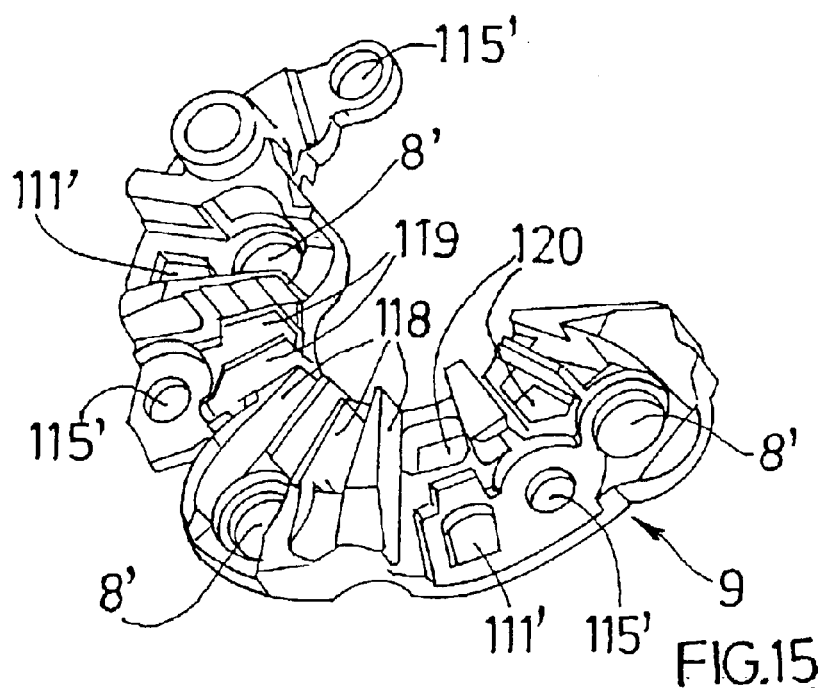
FIG. 15 is a perspective view of a heat dissipater of the rectifier unit of FIG. 14.

Thus, in FIG. 14, part of the rear bearing 16 can be seen with its peripheral flange formed with openings 5 and its radial plate 3 also provided with openings, one of which has the reference numeral 7 in FIG. 7.

The unit 1 includes a plurality of positive diodes 8 supported by a metallic heat dissipater 9 in the form of a plate, together with a plurality of negative diodes 10 carried by the plate 3 of the rear bearing 16. In this example, three positive diodes 8 and three negative diodes 10 are provided.

Each of the diodes 8, 10 has a cylindrical body and tails as can be best seen in FIG. 7. These diodes are mounted in head-to-toe relationship in order to reduce overall axial size.

The negative diodes 10 are force-fitted by means of their body, which is knurled for that purpose, into holes in the plate 3 in the bearing 16, and in a zone that surrounds the openings 7.

The tails 111 of the negative diodes 10 pass through holes 111' formed in the plate 9.

The positive diodes 8 are force-fitted by means of their bodies in holes 8' formed in the plate 9. The tails of the positive diodes pass through the openings 7 in the plate 3 of the bearing 16, as can be seen in FIG. 7. The plate 9 is of mouldable material, and in this example it is made of aluminium. The plate has the general form of an annular sector.

The plate 9 is separated from the plate 3 of the bearing 16 by means of a plate 113 of electrically insulating material, which in this example is a plastics material moulded in situ on an assembly of flat electrical conductors. The plate 113 has the general form of an annular sector.

The plate 9 is perforated and includes a large number of ribs 118, 119 in the form of fins.

A passage aperture 120 for cooling air is preferably formed between each pair of adjacent fins 118, 119.

Some of the fins 118 extend to the outer periphery of the plate 9.

Two positive diodes 8 are fitted close to the outer periphery of the plate 9.

The diodes 8 which are disposed close to the outer periphery of the plate 9 are located substantially on the same pitch circle as the holes 111' of the diodes 10 and the passage holes 115' for the screws for fastening the plate 9 or plate 3.

The third diode 8 is fitted close to a thickened mounting portion of a threaded portion 117 which serves as a terminal for connection to the positive terminal of the battery of the vehicle.

A voltage regulator 116 and the brush carrier with the reference numeral 200 in FIG. 14 are also provided.

The regulator 116 is of the same type as that described in the document FR-A-2 780 577, and accordingly comprises a sub-assembly including a sub-strate on which at least one elementary electronic component is mounted, such as a chip other than an integrated circuit. The sub-assembly includes, in one embodiment, a plurality of elementary electronic components and a plurality of integrated circuits.

The sub-assembly includes means for mounting the brushes, and in one embodiment it is accordingly integrated with the brush carrier 200.

For more detail, reference should be made to the said document, the elementary electronic component being connected to metallic tracks, being mounted in an orifice of the substrate.

The fins 118, 119 project at right angles to the upper surface of the thermally conductive plate 9.

The middle positive diode 8 is located between two long fins 118.

As is clearly shown in the drawings, the plate is pierced between the fins in the available space. The apertures 120 constitute, with the inwardly convergent radial fins 118, 119, axial cooling channels which ensure accelerated flow of cooling air aspirated by the internal fan and subsequently passed through the lateral openings 5 of the bearing.

FIG. 17 shows the insulating intermediate plate 13, which includes, in a way corresponding to the support plate 9 of the positive diodes 8, passage holes 122 for the tails of the positive diodes 8, passage holes 123 for the fastening screws 115, and passage holes 124 for the passage tails of the negative diodes 10, all within the outer annular zone close to its periphery, the annular portion 125 situated further inwards being provided with wide apertures 126 for flow of cooling air, the disposition of which corresponds to the apertures 120 in the plate 8. Within the scope of the invention it can be envisaged that this annular portion 125 of the insulating plate be omitted, which reduces the size of the plate 13.

FIG. 18 shows the protective cap 27, which is distinguished by its optimised configuration which is perfectly adapted to the dissipater, due to the face that the part thereof which is situated above the latter is greatly perforated, only leaving narrow radial ribs 128 and an equally narrow coaxial rib 129. The large apertures 130 which are thereby obtained, which extend radially like the cooling fins 119, 118, ensure purely axial accelerated flow of the cooling air which is aspirated, and therefore optimum cooling of the rectifier unit of the alternator. It will be noted that it is only the part that defines the transversely oriented central plate of the cap 27 that is provided with apertures, the axially oriented annular flange of the cap, which is joined to the outer periphery of the central plate, not having any apertures. The air therefore passes axially through the apertures 128 and 120, given that the apertures 120 are in facing relationship with the openings 7 in the rear bearing.

In all cases, the rectifier unit includes a dissipater 9 in the form of a perforated plate with radial fins, a plate 13 with connectors, and a third component which constitutes the support for the negative diodes and is defined by the rear bearing, or a plate fixed with respect to the rear bearing. There are thus three main components.

The connector 113 is interposed between the dissipater 9 and the plate 3 of the rear bearing or a plate fixed with respect to the latter. Radial channels are formed between the fins. The tails of the positive diodes are directed towards the support for the negative diodes. At least two of the positive diodes lie below the apertures 120.

Thanks to the radial fins and the apertures defined between them in the support dissipater for the positive diodes, accelerated, and therefore optimised, flow of cooling air is obtained, to which the openings formed facing each other in the bearing and in the insulating plate constituting a connector contribute. Given that the positive diodes are disposed close to the outer periphery of the support plate, the connector may be of reduced size. It should be noted that all the openings are so configured that they reduce energy losses while facilitating air flow. It should therefore be emphasised that the openings in the cap are aligned with the fins of the dissipater that supports the positive diodes.

The fact that the fins 118, 119 converge inwardly enables the flow of cooling fluid, which in this case is air but which in another version may be some other fluid, to be accelerated.

The arrangement of two of the positive diodes at the outer periphery of the dissipater 9 enables the thickness of the dissipater 9 to be increased at this point, creating on the latter, for example, a thickened portion having a generally trapezoidal cross section. In this way, heat is evacuated in the best possible way and the plate 9 is stiffened. Preferably, the plate 9 is made by moulding and is of aluminium.

It will be noted that the winding 23 has several coils so arranged as to form, in this case, the three phases of the alternator. FIG. 1 shows three electrical conductors, namely one per phase. These conductors are connected to the flat conductors of the plate 113 through elements 114 in the form of wire grippers which are included in the flat conductor elements.

The plate 3 has apertures for passage of the conductors of the phases, as can be seen in FIG. 7. It will be noted that shouldered, electrically insulating sleeves are interposed between the screws 115 and the holes 115' so as to prevent any short circuit. Some of the screws 115 have a threaded portion for fastening to the cap 27 by snap-fitting.

Thus, in accordance with the invention, the alternator described above has a stator which is perfectly centred due to the resin, and a casing with a reduced axial size, together with a well cooled rectifier unit. The alternator is powerful within a reduced volume while being less noisy.

What is claimed is:

1. A rotary electrical machine (10) of the type comprising a rotor (13), a stator (12) of generally cylindrical annular form surrounding the rotor (13) and arranged within a casing (14) comprising a rear portion (16) and a front portion (18), which are joined together along a junction plane (P) at right angles to the axis (X—X) of the rotor of the machine (10), wherein the external axial face (24) of the stator (12) delimits, with the internal axial face (30) of the casing (14), an annular radial space (32), and wherein the stator (12) is clamped axially between the opposed radial engagement surfaces (36, 48) which are formed in each of the two portions (16, 18) of the casing (14), with at least one elastically deformable element (34, 46) being interposed and compressed axially between each of the two engagement surfaces (36, 48) and a portion of the facing annular radial end face (20, 22) of the stator (12), characterised in that at least part of the radial annular space (32) contains elastically deformable thermally conductive resin (50) which is interposed radially between the casing (14) and the stator (12), whereby to effect radial mechanical decoupling between the stator (12) and casing (14), and whereby to dissipate heat energy from the stator (12) to the casing (14).

2. A rotary electrical machine (10) according to claim 1, characterised in that only the front portion (18) of the casing (14) contains the thermally conductive resin (50).

3. A rotary electrical machine (10) according to claim 1, characterised in that an elastically deformable flat annular seal (46) is interposed axially between the annular front radial end face (22) of the stator (12) and the engagement surface (48) formed in the front portion (18) of the casing (14).

4. A rotary electrical machine (10) according to claim 1, characterised in that a set of elastically deformable pads (34) are spaced apart circumferentially and compressed axially between the rear annular radial end face (20) of the stator (12) and a portion of the engagement surface (36) defined in the rear portion (16) of the casing (14).

5. A rotary electrical machine (10) according to claim 4, characterised in that each pad (34) includes a positioning lug (38) in the form of a dovetail which is received axially in a complementary seating (44) formed in the rear portion (16) of the casing (14).

6. An alternator (10) for a motor vehicle, characterised in that it is made in accordance with claim 1.

7. An alternator (10) according to claim 6, characterised in that it is adapted to work alternately as a starter motor or as an alternator.

* * * * *